US007343241B2

(12) United States Patent
Krishnan et al.

(10) Patent No.: US 7,343,241 B2
(45) Date of Patent: Mar. 11, 2008

(54) SECURITY SOFTWARE LAYER PROTECTION FOR ENGINE START

(75) Inventors: Ananth Krishnan, Ypsilanti, MI (US); Pascal Tissot, Gerstheim (FR); Hiep T. Do, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 19 days.

(21) Appl. No.: 11/432,455

(22) Filed: May 11, 2006

(65) Prior Publication Data

US 2007/0265765 A1 Nov. 15, 2007

(51) Int. Cl.
*B60T 7/12* (2006.01)
*B60Q 1/00* (2006.01)

(52) U.S. Cl. ..................... 701/113; 340/425.5; 180/271

(58) Field of Classification Search ................ 701/101, 701/113, 114, 115; 340/425.5; 180/271, 180/287
See application file for complete search history.

(56) References Cited

U.S. PATENT DOCUMENTS 5,216,341 A * 6/1993 Nomura et al. ............. 318/444
5,506,562 A * 4/1996 Wiesner .................. 340/425.5
5,828,297 A * 10/1998 Banks et al. ........... 340/426.12
6,593,713 B2 * 7/2003 Morimoto et al. .......... 318/139

* cited by examiner

*Primary Examiner*—John T. Kwon

(57) ABSTRACT

An engine start security control system for a vehicle having a transmission that is driven by an engine includes a first module that generates a first engine start flag based on an internal mode switch (IMS) signal and a second module that generates a second engine start flag based on a modified IMS signal. A third module selectively generates an engine start allow signal based on the first and second engine start flags.

12 Claims, 3 Drawing Sheets

SECURITY SOFTWARE LAYER PROTECTION FOR ENGINE START

FIELD OF THE INVENTION

The present invention relates to vehicle control systems, and more particularly to a control system security software layer protection for engine start.

BACKGROUND OF THE INVENTION

Vehicles can include an internal combustion engine that drives a powertrain to propel the vehicle. In some instances, the powertrain includes an automatic transmission that multiplies drive torque generated by the engine. In cases where engine start is initiated (i.e., cranking of the engine using a starter motor), traditional vehicles use a switch to determine whether the transmission is in a non-power transfer range (e.g., park (P) or neutral (N)). Engine start is only allowed when the transmission is in P or N while being prohibited otherwise (e.g., while the transmission is in drive (D) or reverse (R)).

In traditional vehicle systems one of a plurality of control modules can make an independent assessment of whether to allow an engine start using a separate P/N switch that is connected to a mechanical parking mechanism of the transmission. In such systems, the onus of ensuring a proper engine start signal lies with the particular control module. The controller area network (CAN) system is always secure in that any failures in the securely-transmitted signal are recognized and engine start is prohibited. The sources of failure that can contribute to a non-secure start of the engine include, but are not limited to sensor failures, control module hardware failures and control module software failures.

Sensor failures in a security-critical system generally require redundant sensors to be used in the system design if they are security-critical. Control module hardware failures can be detected with security-critical microprocessor architectures and industry standards exist for these architectures. Control module software failures can be protected against by having a secondary path of calculation for the security-critical variable. These secondary paths have to be specifically designed for the particular feature which is identified as a security-critical feature. Software failures in the TCM software could lead to an incorrect CAN message being sent to the ECM, which could result in an engine start being allowed when the transmission is in a power flow condition (e.g., D or R ranges).

SUMMARY OF THE INVENTION

Accordingly, the present invention provides an engine start security control system for a vehicle having a transmission that is driven by an engine. The engine start security control system includes a first module that generates a first engine start flag based on an internal mode switch (IMS) signal and a second module that generates a second engine start flag based on a modified IMS signal. A third module selectively generates an engine start allow signal based on the first and second engine start flags.

In another feature, the engine start security control system further includes a range selector lever associated with the transmission and a sensor that generates the IMS signal based on a position of the range selector lever.

In another feature, the third module generates the engine start allow signal if the first engine start flag and the second engine start flag are both set.

In another feature, the third module generates an engine start prohibit signal if the first engine start flag is not set.

In another feature, the third module generates an engine start prohibit signal if the second engine start flag is not set after a threshold time.

In still another feature, the engine start security control system further includes a fourth module that generates the modified IMS signal based on the IMS signal.

In yet another feature, the modified IMS signal is a two's complement of the IMS signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
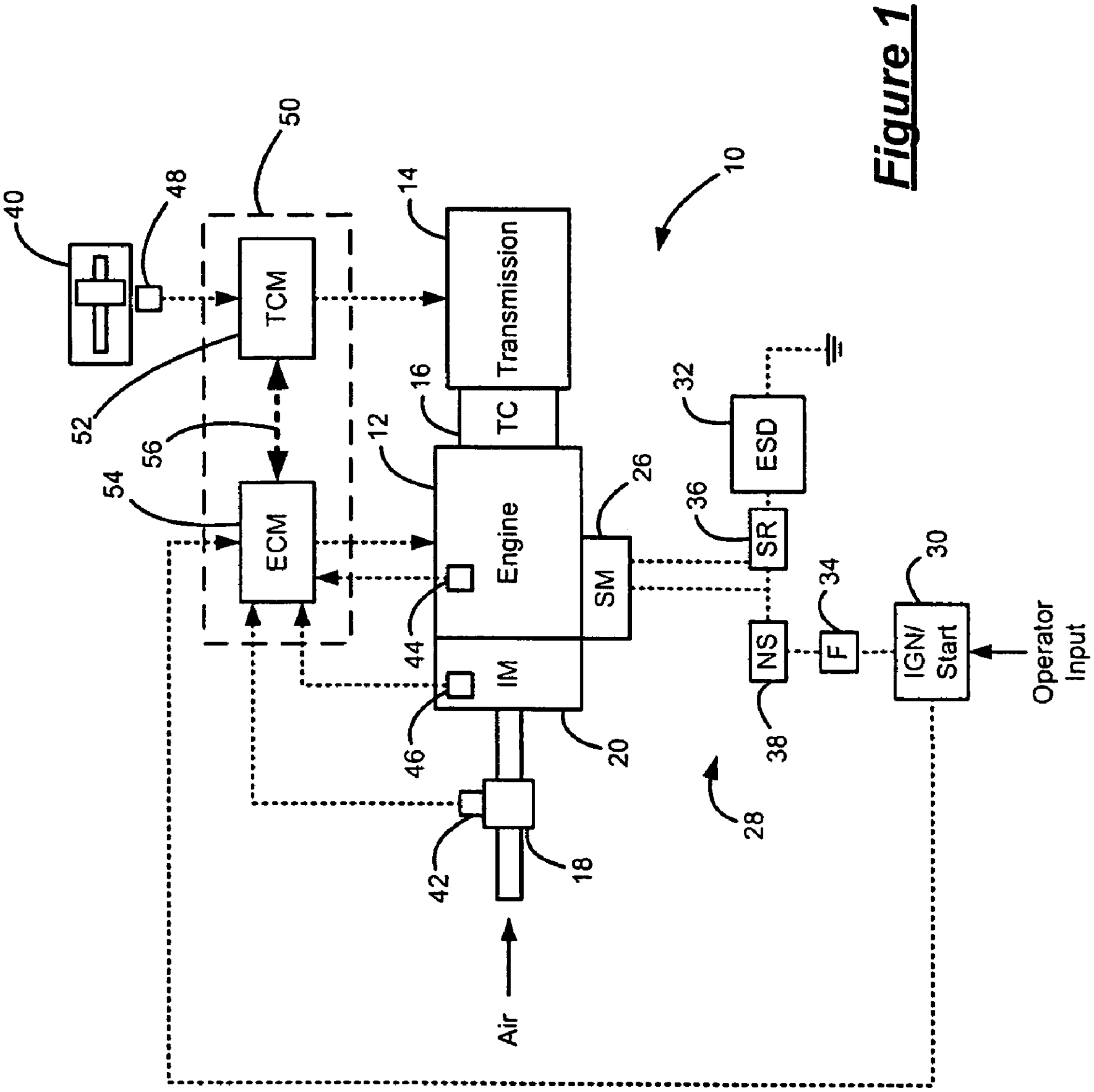
FIG. 1 is a functional block diagram of a vehicle that implements the engine start security control system of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is illustrated. The vehicle system 10 includes an engine 12 that drives a transmission 14 through a coupling device 16. In the case where the transmission 14 includes an automatic transmission, the coupling device 16 is a torque converter. The engine 12 combusts a fuel and air mixture within cylinders (not shown) to drive pistons slidably disposed within the cylinders. The pistons drive a crankshaft (not shown) to produce drive torque. Air is drawn through a throttle 18 and into an intake manifold 20 that distributes air to the individual cylinders. Exhaust generated by the combustion process is exhausted to an after-treatment system (not shown) through an exhaust manifold (not shown).

The vehicle system 10 further includes a starter motor 26 and a power system 28. The starter motor 26 selectively engages a flywheel ring gear, as explained in further detail below, to rotatably drive the crankshaft. In this manner, the engine 12 is cranked during a start-up routine. The power system 28 includes an ignition switch 30, an energy storage device (ESD) 32 (e.g., battery or super-capacitor), a fuse 34 and a starter relay 36. The power system 28 enables the starter motor 26 to engage and drive the flywheel ring gear based on an operator input (e.g., turning the ignition switch to START). The ESD 32 provides power to power the starter motor 26 through the fuse 34.

A range selector lever 40 is provided and enables a vehicle operator to select one of a plurality of transmission ranges. Exemplary transmission ranges include, but are not limited to, park (P) and neutral (N), which are non-power flow ranges, and drive (D) and reverse (R), which are power flow ranges.

Various sensors are provided that detect vehicle operating conditions. For example, a throttle position sensor (TPS) 42 is responsive to a position of the throttle and generates a signal based thereon. An engine RPM sensor 44 and an intake manifold absolute pressure (MAP) sensor 46 are responsive to engine speed and intake MAP, respectively, and generate respective signals based thereon. An internal mode switch (IMS) 48 is responsive to the position of the range selector lever and generates an IMS signal based thereon.

A control module 50 regulates operation of the vehicle system based on the various vehicle parameters. The control module 50 of the exemplary vehicle system 10 includes first and second sub-modules 52, 54, respectively, (e.g., a transmission control module (TCM) and an engine control module (ECM), respectively). Although the TCM and ECM are illustrated as sub-modules of the control module 50, it is anticipated that the TCM and ECM can be provided as separate control modules. The TCM and ECM communicate via a controller area network (CAN) 56.

The control module 50 executes the engine start security control of the present invention. More specifically, the TCM sub-module 52 includes a control layer and a validation layer to determine whether a security-critical state is achieved. As used herein, the term control layer refers to the normal software path, while the term validation layer refers to a secondary or redundant software path. Both the control and validation layers use the IMS signal to generate engine start flags $F_{STARTCL}$ and $F_{STARTVL}$, respectively. More specifically, if the control layer determines that an engine start is allowable (i.e., the transmission is in P or N), $F_{STARTCL}$ is set TRUE or is set equal to a value (e.g., 1). If the control layer determines that an engine start is not allowable (i.e., the transmission is not in P or N), $F_{STARTCL}$ is set FALSE or is set equal to another value (e.g., 0). Similarly, if the validation layer determines that an engine start is allowable, $F_{STARTVL}$ is set TRUE or is set equal to a value (e.g., 1) and if the validation layer determines that an engine start is not allowable, $F_{STARTVL}$ is set FALSE or is set equal to another value (e.g., 0).

$F_{STARTVL}$ is calculated differently from the $F_{STARTCL}$. Exemplary differences between the calculations include that the validation layer processes a modified IMS signal (e.g., the two's complement of the original IMS signal) and processes the modified IMS signal differently than the control layer processes the IMS signal. Further, an optimal processing algorithm is used in the validation layer, which minimizes de-bouncing of the IMS signal, whereas the de-bouncing algorithm of the control layer is more complex. De-bouncing refers to the process where the shake or jitter in the IMS signal that results from settling of the lever position after moving from another position is filtered out or otherwise ignored.

When the control layer outputs a signal indicating that engine start is allowed (i.e., $F_{STARTCL}$ is set TRUE or $F_{STARTCL}$=1), the validation layer confirms whether the output signal is valid by comparing it to $F_{STARTVL}$. More specifically, if $F_{STARTCL}$ is set TRUE or $F_{STARTCL}$=1 (i.e., the control layer indicates that an engine start is allowed), and the validation layer output signal indicates that an engine start is not allowed (i.e., $F_{STARTVL}$ is set FALSE or $F_{STARTVL}$=0) then a fail flag ($F_{FAIL}$) is set or is set equal to a value (i.e., 1) after a threshold time ($t_{THR}$), which results in a reset of the TCM. If the control layer output signal indicates that the engine start is not allowed (i.e., $F_{STARTCL}$ is set FALSE or $F_{STARTCL}$=0), no validation layer protection is needed, because the engine start prohibited state is inherently a secure state.

The engine start security control of the present invention recognizes and maximizes the robustness of the failure mode of the IMS. The failure mode of the IMS is such that it takes two electrical failures to wrongly indicate a valid incorrect state. This fact can be relied upon to cover for electrical failures. Further, the control module 50 has a security-critical architecture that detects TCM hardware failures and commands a safe reset of the TCM. As a result, the only failures that need to be protected against are failures in the TCM software. These software-type failures will be detected by the engine start security control as implemented in at least one of the exemplary processes described below, to provide a completely secure design against incorrect engine start.

In accordance with a first exemplary process, the validation layer generates the modified IMS signal and determines the transmission range (e.g., P or N) from an encoding table based thereon. The validation layer sets $F_{STARTVL}$ based on the transmission range. More specifically, if the transmission range is P or N (i.e., a non-power flow range), $F_{STARTVL}$ is set TRUE or is set equal to 1 to indicate that an engine start is allowed. $F_{STARTCL}$ is generated and is compared to $F_{STARTVL}$ in accordance with the following:

If $F_{STARTCL}$ is TRUE (or 1) and $F_{STARTVL}$ is TRUE (or 1), then start timer (t);

and

If $t<t_{THR}$, then allow engine start;

else prohibit start.

The above-described first exemplary process can be used with control layer processing that de-bounces the IMS signal and sends out $F_{STARTCL}$, wherein if the IMS sensor reads a transition from P or N, engine start is allowed for a threshold time period until the next valid range (e.g., P, R, N, D) is achieved. Engine start is prohibited if the threshold time period elapses before achieving a valid range state.

In accordance with a second exemplary process, as soon as the IMS signal indicates a transition from P or N, $F_{STARTCL}$ is immediately set to FALSE or 0 to prohibit engine start. Once the IMS signal settles (i.e., after de-bouncing), $F_{STARTCL}$ is set to TRUE or 1 if the IMS detects P or N in steady-state. This can be done with an allowance for noise spikes. The validation layer then only checks and sets $F_{STARTVL}$ to FALSE or 0 if $F_{STARTCL}$ is TRUE or 1, and if the validation layer determines that the range is neither P nor N based on the two's complement of the IMS signal. No de-bouncing or timers are needed in the validation layer. Because de-bouncing of the IMS signal has already occurred in the control layer and signals have settled, IMS readings in the validation layer match the control layer IMS readings when there is no failure.

Figure 2:
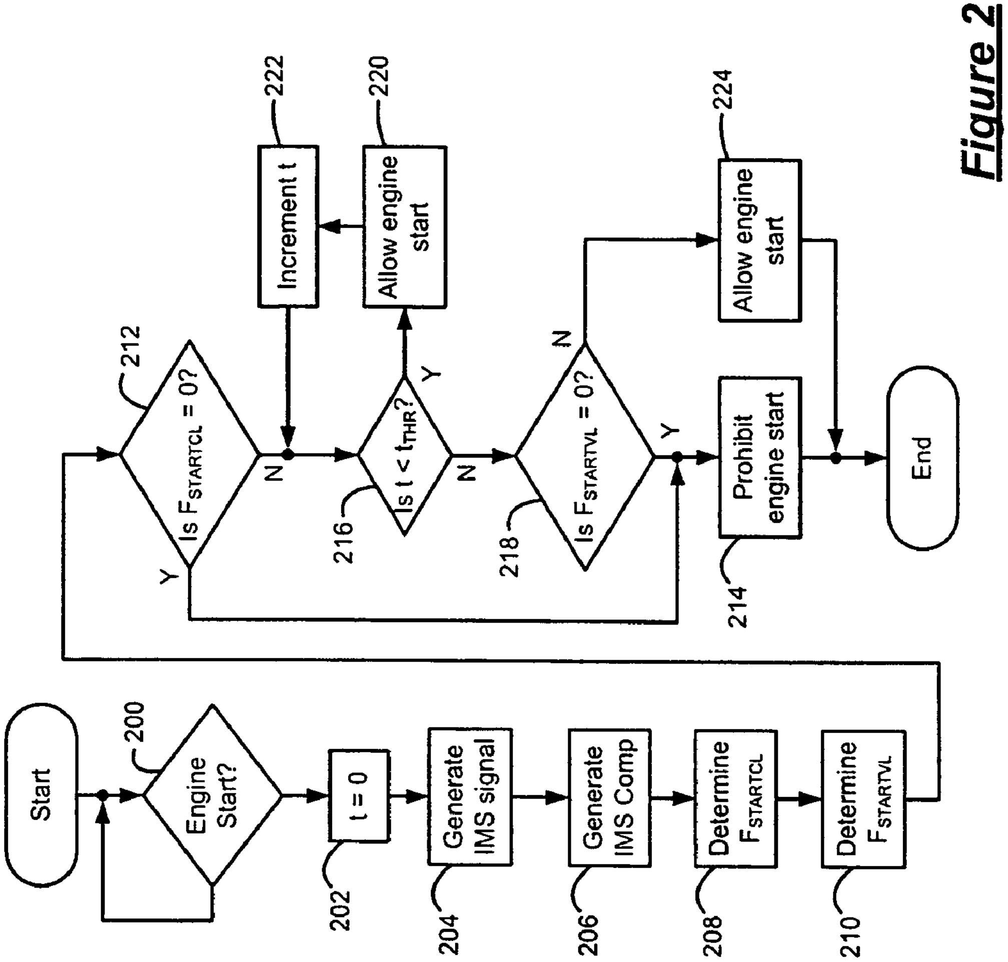
FIG. 2 is a flowchart illustrating exemplary steps executed by the engine start security control system.

Referring now to FIG. 2, exemplary steps executed by the engine start security control will be described in detail. In step 200, control determines whether an engine start is desired. If an engine start is not desired, control loops back. If an engine start is desired, control sets a timer (t) equal to zero in step 202. In steps 204 and 206, control generates the IMS signal and the complement of the IMS signal, respectively. Control determines $F_{STARTCL}$ and $F_{STARTVL}$ in steps 208 and 210, respectively.

In step 212, determines whether $F_{STARTCL}$ is set. If $F_{STARTCL}$ is not set (e.g., is equal to zero), control continues in step 214. If $F_{STARTCL}$ is set (e.g., is not equal to zero), control determines whether t is greater than a timer threshold ($t_{THR}$) in step 216. If t is greater than $t_{THR}$, control continues in step 218. If t is not greater than $t_{THR}$, control temporarily allows an engine start in step 220. In this manner, engine start is allowed regardless of $F_{STARTVL}$ for a brief period of time, during which de-bouncing of the IMS signal occurs. In step 222, control increments t and loops back to step 216.

In step 218, control determines whether $F_{STARTVL}$ is set. If $F_{STARTVL}$ is not set (e.g., is equal to zero), control prohibits engine start in step 214 and control ends. If $F_{STARTVL}$ is set (e.g., is not equal to zero), control allows engine start in step 224 and control ends.

Figure 3:
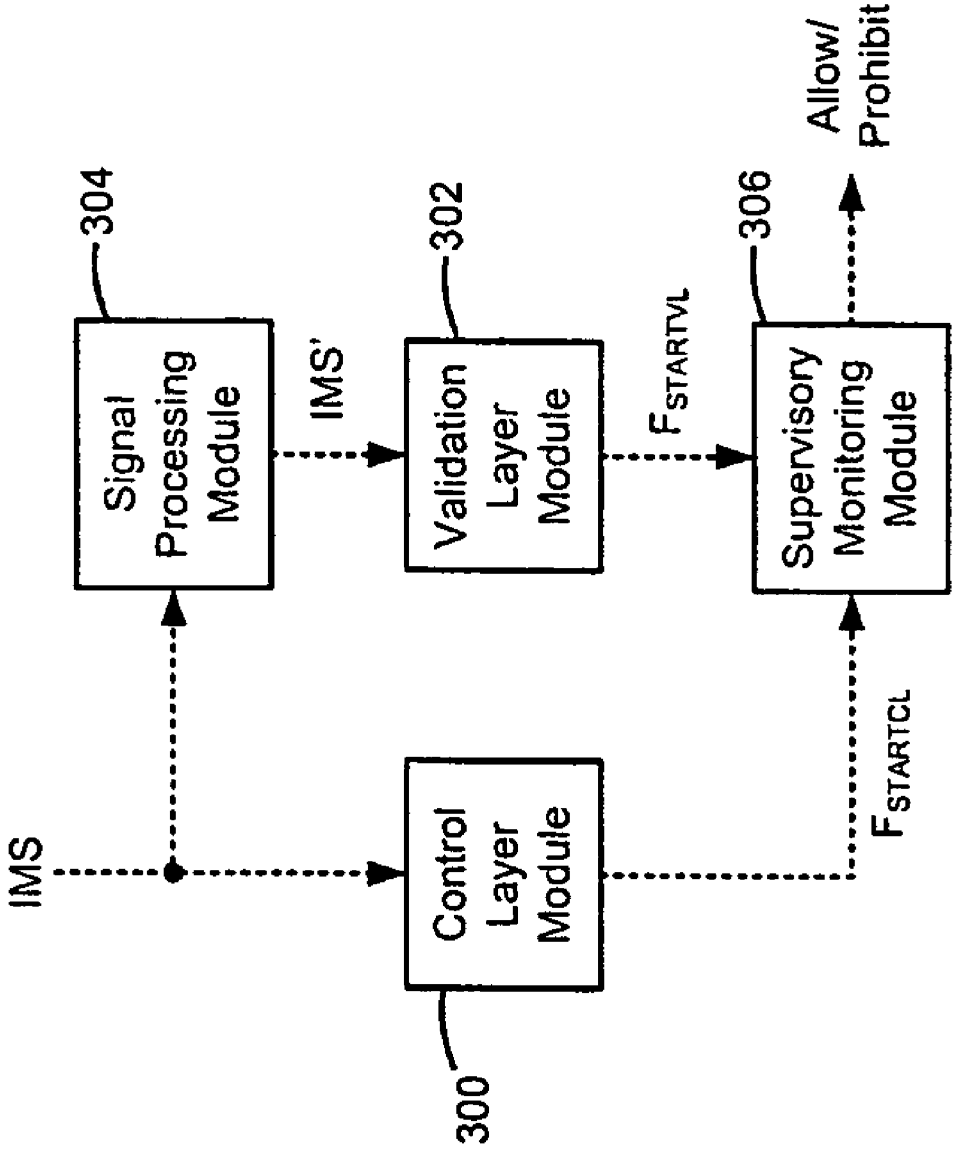
FIG. 3 is a functional block diagram of exemplary modules that execute the engine start security control of the present invention.

Referring now to FIG. 3, exemplary modules that execute the engine start security control will be described in detail. The exemplary modules include a control layer module 300, a validation layer module 302, a signal processing module 304 and a supervisory monitoring module (SMM) 306. The control layer module 300 and the signal processing module 304 each receive the IMS signal. The control layer module 300 processes the IMS signal and generates $F_{STARTCL}$ based thereon.

The signal processing module 304 processes the IMS signal and generates a modified IMS signal (IMS'). IMS' can be, for example, the two's complement of the original IMS signal or some other IMS-based signal. The validation layer module 302 processes IMS' and determines $F_{STARTVL}$ based thereon. The SMM 306 generates one of an engine start allow and an engine start prohibit signal based on $F_{STARTCL}$ and $F_{STARTVL}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine start security control system for a vehicle having a transmission that is driven by an engine, comprising:
- a first module that generates a first engine start flag based on an internal mode switch (IMS) signal;
- a second module that generates a second engine start flag based on a modified IMS signal; and
- a third module that selectively generates an engine start allow signal based on said first and second engine start flags.

2. The engine start security control system of claim 1 further comprising:
- a range selector lever associated with said transmission; and
- a sensor that generates said IMS signal based on a position of said range selector lever.

3. The engine start security control system of claim 1 wherein said third module generates said engine start allow signal if said first engine start flag and said second engine start flag are both set.

4. The engine start security control system of claim 1 wherein said third module generates an engine start prohibit signal if said first engine start flag is not set.

5. The engine start security control system of claim 1 wherein said third module generates an engine start prohibit signal if said second engine start flag is not set after a threshold time.

6. The engine start security control system of claim 1 further comprising a fourth module that generates said modified IMS signal based on said IMS signal.

7. The engine start security control system of claim 1 wherein said modified IMS signal is a two's complement of said IMS signal.

8. A method of selectively enabling an engine start in a vehicle having a transmission that is driven by an engine, comprising:
- generating an internal mode switch (IMS) signal based on a position of a range selector lever;
- modifying said IMS signal to provide a modified IMS signal;
- generating a first engine start flag based on said IMS signal;
- generating a second engine start flag based on said modified IMS signal; and
- issuing an engine start allow signal based on said first and second engine start flags.

9. The method of claim 8 wherein said engine start allow signal is issued if said first engine start flag and said second engine start flag are both set.

10. The method of claim 8 wherein an engine start prohibit signal is issued if said first engine start flag is not set.

11. The method of claim 8 wherein an engine start prohibit signal is issued if said second engine start flag is not set after a threshold time.

12. The method of claim 8 wherein said modified IMS signal is a two's complement of said IMS signal.

* * * * *